Nov. 4, 1969  F. H. MARCELISSEN  3,476,480
APPARATUS COMPRISING ONE OR MORE PROCESSING UNITS FOR
REPRODUCTION MATERIAL
Filed April 13, 1966  4 Sheets-Sheet 3

INVENTOR

FRANCISCUS HENDRIKUS MARCELISSEN

BY Albert C. Johnston

ATTORNEY

INVENTOR
FRANCISCUS HENDRIKUS MARCELISSEN
BY
ATTORNEY

United States Patent Office 3,476,480
Patented Nov. 4, 1969

3,476,480
APPARATUS COMPRISING ONE OR MORE PROCESSING UNITS FOR REPRODUCTION MATERIAL
Franciscus Hendrikus Marcelissen, Venlo, Limburg, Netherlands, assignor to Van der Grinten N.V., Venlo, Netherlands, a Dutch corporation
Filed Apr. 13, 1966, Ser. No. 542,309
Claims priority, application Netherlands, Apr. 23, 1965, 6505208
Int. Cl. G03b 27/22, 27/30
U.S. Cl. 355—104          10 Claims

ABSTRACT OF THE DISCLOSURE

Apparatus for processing photocopying material is made up principally of extrusions or profiles assembled to upright frame plates which have protrusions thereon for positioning the ends of such profiles. The plates are clamped to opposite ends of some of the profiles by tie rods to form a rigid framework. Others of the profiles serve as panels to cover, or to guide material to and from, driven conveyor mechanism and processing elements for exposing, developing and/or drying said material in the space between said plates. Further extrusions or like profiles secured by tie rods to the outer sides of the frame plates form end housings for accessories and have channel-forming ribs thereon to support accessory mounting devices.

---

The invention relates to an apparatus comprising one or more processing units for reproduction material, such as exposure, developing, and drying units, and a supporting framework, with which framework are connected other structural parts of the apparatus, a number of which, together forming a conveyer system for conveying the reproduction material through the apparatus, are movably driven, while a number are not driven.

Known apparatuses of this kind have a frame which is composed of plates, girders, rods, tubes, and the like, which are joined to one rigid unit by means of welded joints, screw and/or rivet connections. The bearings of the moving parts (rollers, belts, and the like) are mounted in the frame, whilst the frame is also provided with projections, brackets, and the like, serving as fastening points for the non-driven structural parts (metal troughs, feeding and ejecting tables, guide plates, and the like). When an apparatus is constructed in such a manner, many treatments are necessary; sheet metal has to be cut out, bent, dished; parts have to be welded together and subsequently stained, lacquered, and stoved, while many threaded holes often have to be drilled for securing the structural parts to the frame by means of screws. Hence, the manufacture of the apparatus often involves high labour and processing cost.

It is the object of the invention to improve this situation, and to this end an apparatus as referred to hereinbefore is characterized in that the non-driven structural parts are mainly made up of extrusion profiles or comparable profiles, having substantially the same cross-section throughout their length and extending transversely in the apparatus and parallel to each other, at least one of these extrusion profiles being combined with frame plates to a rigid unit forming the supporting frame work of the apparatus, the frame plates being held against the ends of the profiles by means of one or more tie rods, which extend parallel to the profiles through the apparatus, and being provided with protruding parts, which engage with and/or about the ends of the said at least one profile, while the profiles, or at least a number of them, are provided with ribs and/or grooves for securing other structural parts to the profiles by pushing them in and/or for achieving interconnection of the profiles.

By profiles which are comparable to extrusion profiles are understood profiles which have been made in a manner which in point of variability and shapes of the profiles can be compared to extrusion, such as continuous strand moulding.

In order to realize the desired push-in method of securing the structural parts and/or the interconnection of the profiles, the ribs and grooves can be shaped in many different ways; for that purpose they may have, for instance, a dovetailed section, a T-section, or an L-section. The profiles thus indeed assume a complicated shape and consequently are rather expensive, but it has been found that the additional cost of materials involved is amply compensated by the reduction of labour and processing cost which is achieved because the conventional screw, welded, or rivet connections can be omitted.

Extrusion profiles in themselves, made of aluminium, for instance, are known in many forms; among others, they are often applied in architecture, for instance for window and roof constructions, and in the furniture industry, among others as covering strips for table edges. Also in apparatuses for the reproduction technique some components made of extruded profiles are sometimes applied. These known applications, however, are mainly concerned with structural parts which are secured to a supporting structure by means of screws and the like and whose value is especially due to their corrosion-resistant qualities and/or their shapes, which are attractive for decorative purposes. Applications of this kind, however, are not comparable with the one according to the invention, in which the supporting structure is formed by a number of the profiles themselves and in which the profiles are used in the above way for a simple fastening of various structural parts.

In an attractive embodiment of an apparatus according to the invention one of the profiles is made in such a way that it comprises a hollow box girder, which acts as the main girder of the supporting structure. In this way it is possible to realize a very rigid structure. Moreover, it is attractive to provide the protruding parts of the frame plates, which engage with or about the box girder, with toothed surfaces, which, upon the protruding parts being pushed into and round the box girder, are scored into the wall of the box girder and thus secured.

The profies can be shaped in such a manner that together they only form the supporting structure of the apparatus. However, it is particularly attractive to shape at least a number of the profiles in such a way that they form an essential part of the processing units. Thus a profile can have, for instance, a trough-like section and serve as a storage box for the reproduction material to be used. In addition such profiles can form a part of the supporting structure, owing to which the apparatus can be of a simple construction.

Also against the outside of the frame plates extrusion profiles can be fitted, which are normally shorter than the profiles between the frame plates and which form a housing for several accessories of the apparatus. Some profiles can also extend the full lentgh of the apparatus, i.e. also beyond these frame plates.

It is particularly advantageous to equip a number of different apparatuses as referred to hereinbefore partly with similar profiles.

The invention will now be explained more fully with reference to the accompanying drawings, in which FIGURE 1 is a perspective view of a photo-printing apparatus according to the invention, which is combined with the developing apparatus;

FIGURE 3 is a cross-section of this apparatus;

FIGURE 4 is a side view of a frame plate of this apparatus;

Figure 1:
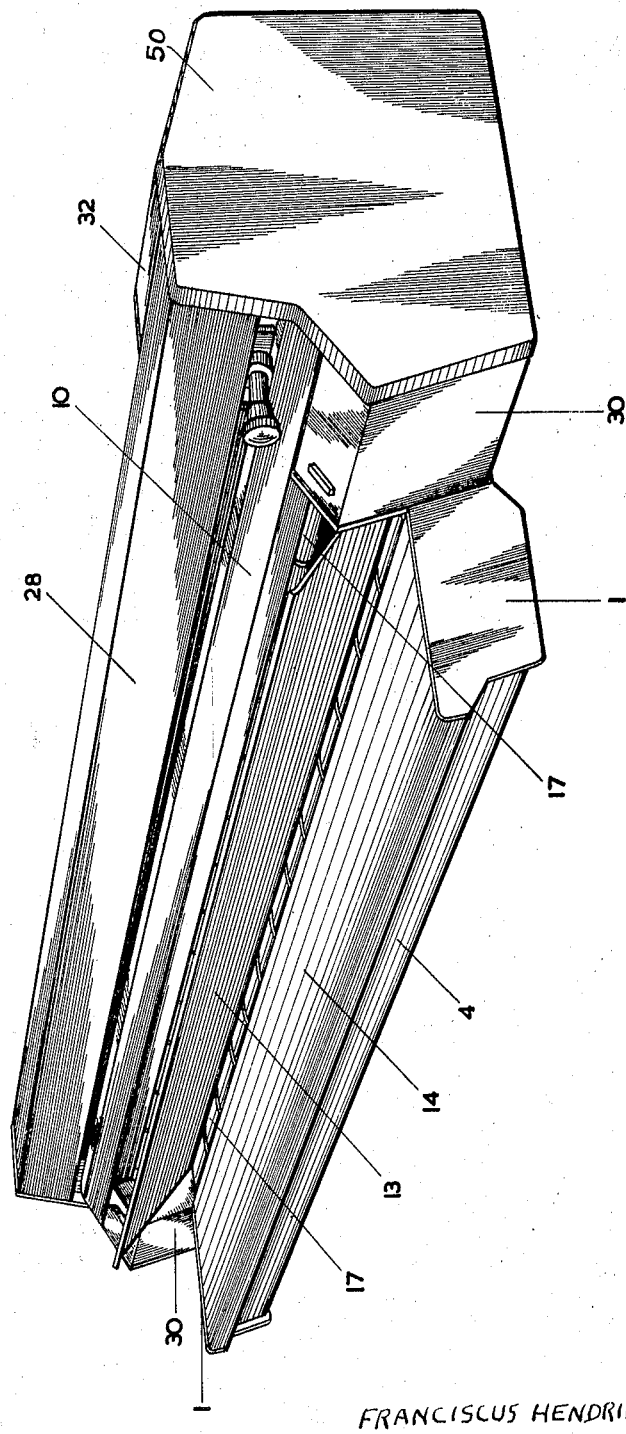
Figure 2:
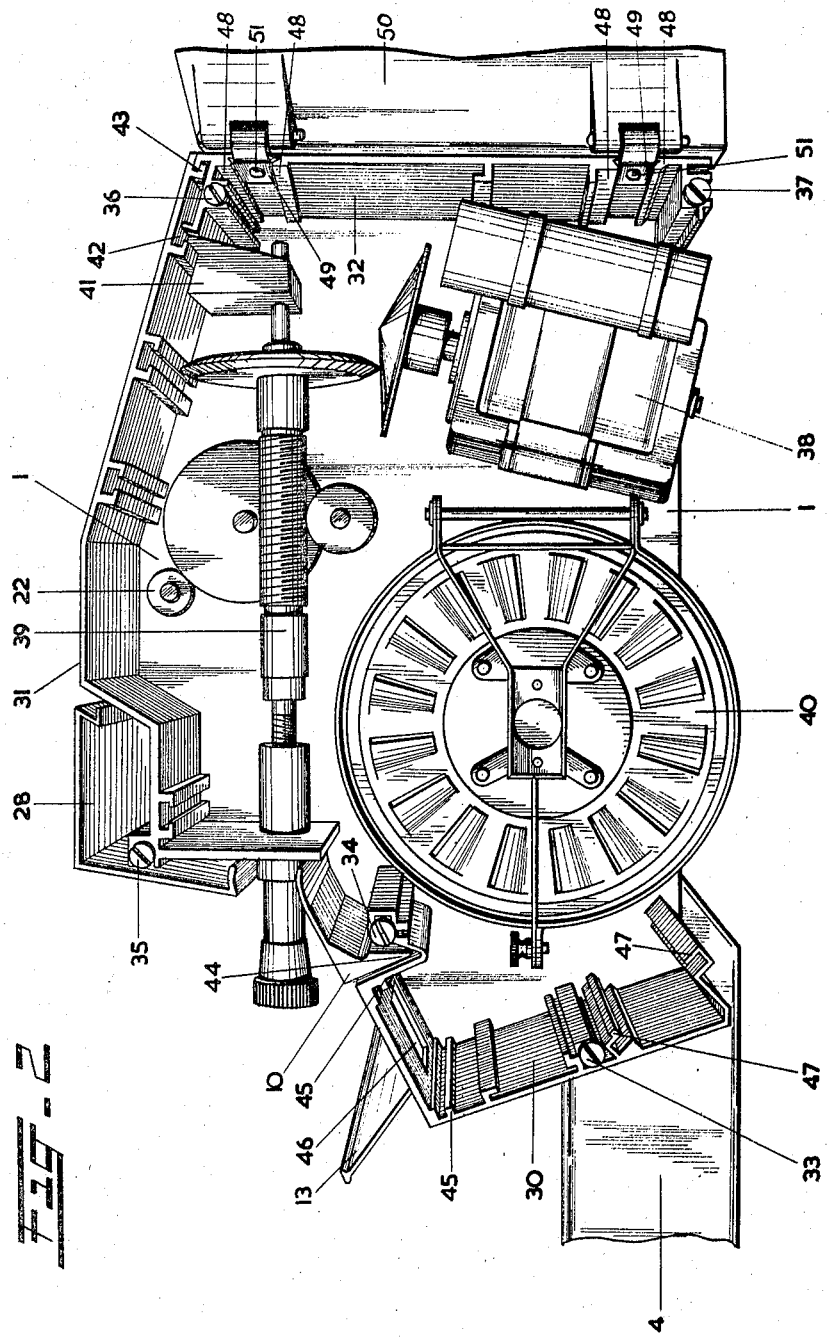
FIGURE 2 is a perspective end view of this apparatus, with the end door opened.

The apparatus shown in FIGURES 1, 2, and 3 comprises a suporting structure which is built up of frame plates 1, which are combined with elongated aluminium extrusion profiles 2, 3, and 4 to a rigid structure. The connection between the frame plates and the extrusion profiles is achieved by means of tie rods 5, 6, 7, which extend transversely through the apparatus and which are provided with threaded ends passing through the frame plates. With the aid of nuts placed on these threaded ends the frame plates are drawn towards each other and are thus held firmly against the ends of the profiles.

Profile 2 has the form of a box girder, while on each of the frame plates, where the box girder is located, a projection 8 is fitted, which is provided with toothed surfaces 9 (FIG. 4). Upon assembly of the parts, the projections 8 are forced into the box girder 2, and the toothed surfaces 9 score into the wall of the box girder. Owing to the deformation thus caused, a superior connection is achieved. Furthermore the frame plates 1 are provided with other protruding ribs, which fit round the other profiles and which serve mainly to facilitate the desired positioning of the profiles during assembly. These ribs are visible in FIGURE 4. Partly they are also visible in FIGURE 3, but for the sake of clearness most of the ribs have been omitted in FIGURE 3, while in FIGURE 2 they are not shown at all.

The supporting structure thus obtained supports extrusion profiles 10, 11, 12, 13, 14, which can be taken out of the apparatus and which, to make this possible, rest on protruding ridges forming part of the frame plates. An extrusion profile 14 is rotatably supported on the tie rod 7.

Located between the frame plates is the exposure unit of the apparatus, which comprises a rotating exposure cylinder 16 as well as a belt conveyor system 17, and guide and driving rollers 18, 19, 20, 21, which are supported in the frame plates 1. A conveyer roll 22 is also supported in the frame plates 1. Close to each of the frame plates 1 small frame plates 23 are pivotally supported on the roll 22, said plates 23 being combined to a rigid unit by means of a rod 24, in which plates the developing rolls 25, 26, 27 are supported. Secured to the frame plates 23 is also an elongated extrusion profile 28, which, as appears from FIGURE 1, extends the full length of the apparatus, i.e. beyond the frame plates 1. By swinging this profile and the frame plates 23 round the roll 22 the developing apparatus can be opened. The developing apparatus needs not be described in detail here because it may be of known kind as shown in U.S. Patent 2,981,171 to Hruby, Streich and Tregay.

Several extrusion profiles form essential parts of the various processing units of the apparatus. Thus a profile 15, which is fitted stationarily inside the cylinder 16 in order to prevent radiation from emanating out of the apparatus, acts at the same time as a supporting member for the tubular light sources 29 of the apparatus, because supporting members 59, which takes up the ends of the lamps in open brackets, are clamped at both ends about profile 15. Moreover, this profile serves as a reflector. The profiles 4 and 14 form together a storage box for reproduction material; the profiles 11 and 12 are troughs for the developing liquid, while profile 28 is a covering for the developing unit.

Outside the frame plates 1 (see FIGURES 1 and 2) shorter extrusion profiles 30, 31, and 32 are fitted with the aid of tie rods 33, 34, 35, 36, and 37, which rest with their heads against the ends of troughs on these profiles, as appears from FIGURE 2, and the last four of which are screwed into threaded holes of the frame plates 1. These tie rods are located in the spaces formed by ribs on these profiles. The tie rod 33 is screwed into the end of the above-mentioned tie rod 7. At both ends of the apparatus, the profiles 30, 31, and 32 together form a housing against the outside of the frame plates 1, and in such a housing a variety of accessories of the apparatus are accomodated, such as the driving motor 38, a speed-regulating mechanism 39, and a ventilator 40 against an end of the glass cylinder 16. These accessories are partly secured to the adjacent end wall 1 in a conventional way by means of screws, partly they are secured to the profiles 30, 31, and 32. Thus it appears from FIGURE 2, that the shaft of the mechanism 39 is supported at one end by a bracket 41, which engages with a hooked part in a groove 42, formed by an L-shaped rib of profile 31 and a flanged edge of profile 32. At 43 in FIGURE 2, the profiles 31 and 32 interlock like hooks; at 44 the elongated profile 10 engages a part of profile 30 whose form has been adapted thereto. Protruding flanges of a switch can be pushed into channels, formed by ribs 45 on profile 30; the operating mechanism of the switch can pass through an opening 46. Between ribs 47 on profile 30 a magnetic door check can be fitted.

Into the dovetailed channels formed by ribs 48 on profile 32 can be pushed hinge blades 49 of a hinged door 50, which is shown in its opened position, and which in its closed position is locked by the door check which is retained by the ribs 47.

Figure 5:
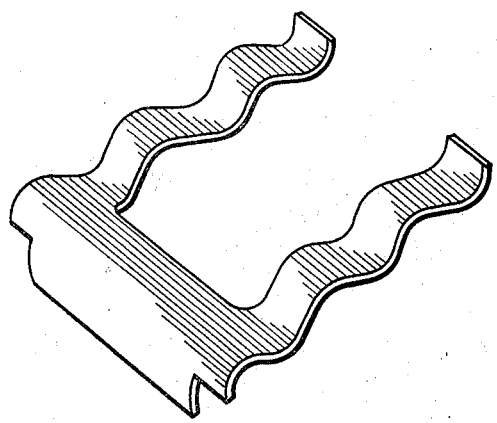
FIGURE 5 is a perspective view of a retaining spring for this apparatus.

All these parts can be kept in place in several ways, for instance by means of screws such as the screws 51 shown in the drawing in the hinge blades 49 of the door 50, or by leaf springs, which are pushed into the channels and retain the parts. In FIGURE 5 such a spring is shown, which is intended to hold the switch in the channels formed by the ribs 45 on the profile 30.

As appears from FIGURE 3, strips 52 of rubber or plastic, forming a light-tight sealing of the storage box, have been pushed into the channel-shaped upper edges of profile 4. At the bottom profile 9 is provided with a groove, into which the ballasts 53 of the lamps have been pushed and secured. Moreover, a cable trough 54 has been formed in profile 9.

Profile 13 is provided with a groove, into which the removing brush 55 has been pushed etc.

A rack 57 for receiving the developed copies has been fitted to a shaft 56 between the frame plates 1.

FIGURE 4, which is a front view of a frame plate 1, clearly shows the ridges which have been formed on the frame plate. Preferably the frame plates are castings, and for convenience they can be provided with similar ridges on either side, so that identical frame plates can be used on both sides of the apparatus. The higher ridges are marked by hatching.

The illustrated frame plate 1 comprises the projection 8, described hereinbefore, which is provided with toothed surfaces 9 for the box girder 2, with in its centre the opening 60 for the tie rod 5. Round the opening 61 a stiffening rim 62 has been formed, into which ridges 63 and 64 end. The ridge 63 supports profile 13, the ridge 64 together with ridge 65 serves to support the bearing of roll 20 in a slidable manner.

Ridges 66 and 67 serve on the one hand to fit profile 4 firmly between them and on the other hand to support the hinged profile 14 in its closed position.

Ridges 68 and 69 serve to support profiles 11 and 12 of the developing apparatus.

On the left side, a ridge 70 supports the profile 3, as shown in FIGURE 4.

As shown in FIGURE 3, the downwardly projecting leg of the profile 10 engages recesses 71 of the frame plates and further rests on profile 11. The hinged profile 28 engages with the flanged rear edge in recesses 72 of the frame plates.

In FIGURE 4 are shown a number of lower ridges, intended to reinforce the frame plates, which ridges will not be described in detail. Round all the holes for tie rods, bolts etc. and along the outer edge of the profile such ridges have been formed.

FIGURE 4 further shows the following holes not yet mentioned: 73 for rod 7, 74 for a small thin rod, onto which sealing strip 52 is pushed, 75 for supporting roll 21, 76 for supporting small supporting rolls of glass cylinder 16, 77 for supporting roll 18, 78 (screw-threaded) for tie rods 34, 35, 36, and 37 (FIGURE 2), 79 for rod 56, 80 for rod 6, 81 for supporting driving roller 19, 82 for supporting conveyor roller 22, 83 for securing the motor 38 against the outside, and 84 for supporting a gear wheel for driving the developing apparatus.

Figure 6:
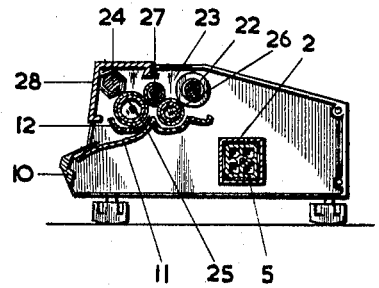
FIGURE 6 is a cross-section of a developing apparatus according to the invention.

Between the frame plates the developing apparatus of FIGURE 6 is provided with a box girder 2 with a tie rod 5 inside it, which together form the supporting structure, while the profiles 10, 11, 12, and 28, the auxiliary frame plates 23, the rollers and rolls 22, 25, 26, and 27, and the shaft 24 of FIGURE 3 are also found in this apparatus. The frame plates have the same form as those in the developing unit of FIGURE 3.

Figure 7:
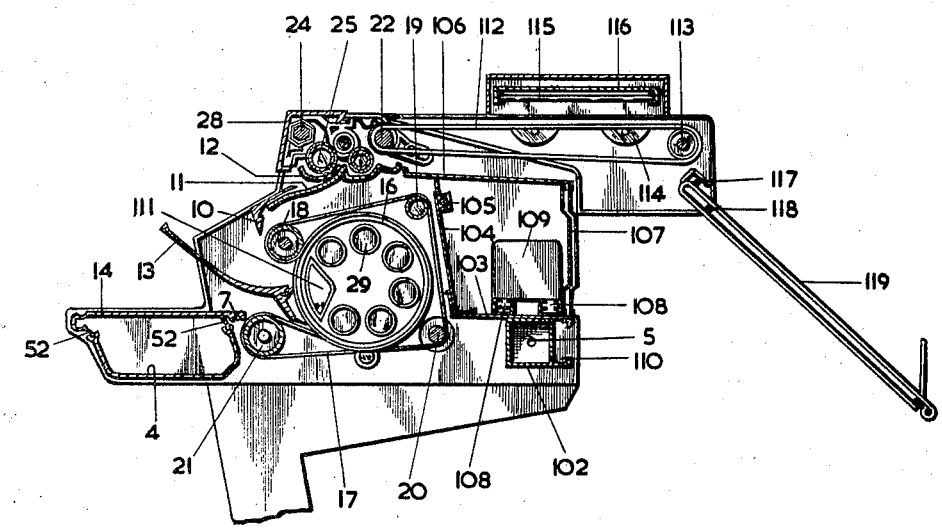
FIGURE 7 is a cross-section of a second photo-printing and developing apparatus according to the invention.

In FIGURE 7 the profiles 4, 10, 11, 12, 13, and 14 of FIGURE 4 can be recognized. The box girder 2 of FIGURE 3 is now constructed as a girder 102 with a rectangular cross-section, forming one unit with a profile 103, which interlocks with a profile 104, with a tie rod 105 extending through a channel at the upper edge of profile 104.

Mounted behind the bottom profile 11 of the developing unit is an extrusion profile 106. At their rear end the profiles 103 and 106 are provided with facing channels for accommodating two sliding doors 107, which are also made of extrusion profiles. The profile 103 is provided at the top with ribs, which together form channels 108, in which the ballasts 109 can be fixed by means of suitable feet. When the sliding doors 107 are opened, these ballasts and other parts of the electric equipment are easily accessible. Cables can be guided through the space between the channels 108 underneath the ballasts, and/or through the channel 110 on the box girder 102.

In this construction six lamps 29 are fitted inside the glass cylinder 16, and the light shield is formed by a box girder 111, which can also serve to conduct and inject cooling air into the cylinder. The conveyor belt system is essentially similar to the one of FIGURE 3.

The developing apparatus, in itself similar to that of FIGURE 3, at the delivery end near the roll 22 is provided with a conveyer belt system 112, which passes round said roll 22 acting as a driving roller and round a roll 113. By this system 112 the developed sheets are guided through a drying unit, comprising electric heating elements 114 underneath and a glass plate 115, enclosed in an extrusion profile 116, on top. This glass plate together with profile 116 acts as a reflection and radiation unit for also drying the top of the copies.

Upon shafts 117 and 118 a delivery rack 119 is hooked, which can easily be removed or turned upside down.

From FIGURE 7 it appears that near the drying unit the frame plates 1 have approximately the same contours as in FIGURES 3 and 6. Accordingly, a drying unit as described for those apparatuses can also at will be included in or omitted from the apparatus according to FIGURES 3 and 6.

Many of the profiles mentioned can be used in a whole series of apparatuses of increasing capacity. The profiles of the developing apparatus of FIGURE 6 can also be used in developing apparatuses with drying units, as shown in FIGURE 7, and in a series of developing apparatuses of different working-widths. The profiles of the apparatus of FIGURE 1 up to and including FIGURE 3 can largely be used also in smaller photo-printing apparatuses, for instance those equipped with one lamp, which may or may not be combined with a developing apparatus, or in larger ones, for instance those equipped with four lamps. In such a larger apparatus it is possible to use partly the profiles of FIGURES 2 and 3, partly those of FIGURE 7. Thus a series of apparatuses can be constructed with a minimum number of different profiles.

What I claim is:

1. Apparatus for processing sheet-like photographic reproduction material, comprising a pair of substantially rigid upright frame plates, a plurality of profiles each of substantially uniform cross-section throughout its length, said profiles extending parallel to each other in the direction transverse to said frame plates, some of said profiles lying between said plates and having said plates clamped against the opposite ends thereof by tie rod means extending parallel thereto between said plates, so as to form with said plates a rigid framework, means for processing said material in the space between said plates, and conveyor means including at least one driven element movable in said space for conveying said material therethrough for treatment by said processing means, said frame plates having protrusions thereon for engaging and positioning the ends of at least said some of said profiles.

2. Apparatus according to claim 1, others of said profiles forming panels respectively for covering portions of said space and guiding said material to and from said conveyor means.

3. Apparatus according to claim 1, said some of said profiles comprising a profile having the form of an elongate hollow box and constituting the main girder of said framework.

4. Apparatus according to claim 3, said protrusions including box-shaped parts protruding from the confronting sides of said frame plates, which parts mate with and have toothed surfaces scored into the wall of said hollow box profile at the ends of the latter.

5. Apparatus according to claim 1, said processing means comprising a developing unit which includes trough means for holding a supply of a developing liquid and driven rollers supported by said frame plates for applying liquid from said supply to said material, said trough means being formed by some of said profiles, some of said rollers serving also as elements of said conveyor means.

6. Apparatus according to claim 1, said processing means comprising an exposure unit which includes a rotatable exposure cylinder having belt means wrapped thereabout and trained upon driving and guiding rollers for rotating said cylinder and for conveying said material thereonto and therefrom, said guiding and driving rollers being mounted in said frame plates and said belt means being elements of said conveyor means.

7. Apparatus according to claim 6, said processing means further comprising a developing unit and a drying unit, said developing unit including trough means for holding a supply of a developing liquid and driven rollers supported by said frame plates for applying liquid from said supply to said material, said trough means being formed by some of said profiles, some of said rollers serving also as elements of said conveyor means, said drying unit being mounted on and extending between said frame plates behind said developing unit, and including means for heating said material and at least one driven element for conveying material from said rollers through the zone of action of said heating means.

8. Apparatus for processing sheet-like photographic reproduction material, comprising a pair of substantially rigid upright frame plates, a plurality of profiles each of substantially uniform cross-section throughout its length, said profiles extending parallel to each other in the direction transverse to said frame plates, some of said profiles lying between said plates and having said plates clamped against the opposite ends thereof by tie rod means extending parallel thereto between said plates, so as to form with said plates a rigid framework, means for processing said material in the space between said plates, and conveyor means including at least one driven element movable in said space for conveying said material therethrough for treatment by said processing means, said frame plates having protrusions thereon for engaging and positioning the ends of at least said some of said profiles, at least one of said frame plates having secured to its outer side further profiles, each of substantially uniform cross-section throughout its length, which form a housing for accessories of the apparatus, said further profiles having thereon integral channel-forming ribs extending longitudinally thereof to support devices for mounting such accessories.

9. Apparatus according to claim 8, said further profiles also having thereon integral ribs which form troughs extending longitudinally thereof, these profiles being secured to the adjacent frame plate by tie rods which are disposed in and have heads bearing against the ends of said troughs.

10. Apparatus according to claim 8, each of said frame plates having at its outer side such a housing formed by several of such further profiles secured thereto.

References Cited

UNITED STATES PATENTS

| | | | |
|---|---|---|---|
| 2,774,290 | 12/1956 | Mormann | 95—77.5 |
| 3,037,772 | 6/1962 | Bonanno | 46—17 XR |
| 3,266,407 | 7/1966 | Lucas | 95—75 XR |
| 3,291,024 | 12/1966 | Eisner et al. | 95—77.5 |
| 3,339,920 | 9/1967 | Moritz | 46—17 XR |

NORTON ANSHER, Primary Examiner

F. L. BRAUN, Assistant Examiner

U.S. Cl. X.R.

355—106